US010230720B2

United States Patent
Raepple et al.

(10) Patent No.: US 10,230,720 B2
(45) Date of Patent: Mar. 12, 2019

(54) AUTHORIZATION CODE FLOW FOR IN-BROWSER APPLICATIONS

(71) Applicant: SAP SE, Walldorf (DE)

(72) Inventors: Martin Raepple, Lautertal (DE); Vladimir Savchenko, Sofia (BG); Milen Manov, Sofia (BG)

(73) Assignee: SAP SE, Walldorf (DE)

( * ) Notice: Subject to any disclaimer, the term of this patent is extended or adjusted under 35 U.S.C. 154(b) by 206 days.

(21) Appl. No.: 15/376,174

(22) Filed: Dec. 12, 2016

(65) Prior Publication Data

US 2018/0167384 A1 Jun. 14, 2018

(51) Int. Cl.
*G06F 21/33* (2013.01)
*H04L 29/06* (2006.01)
*H04L 29/08* (2006.01)

(52) U.S. Cl.
CPC ........ *H04L 63/0853* (2013.01); *G06F 21/335* (2013.01); *H04L 63/083* (2013.01); *H04L 63/0807* (2013.01); *H04L 67/02* (2013.01)

(58) Field of Classification Search
CPC ............. H04L 63/0853; H04L 63/0807; H04L 63/083; H04L 67/02; G06F 21/335
See application file for complete search history.

(56) References Cited

U.S. PATENT DOCUMENTS

| | | | | |
|---|---|---|---|---|
| 9,781,122 B1* | 10/2017 | Wilson | .................. | H04L 63/101 |
| 10,015,157 B2* | 7/2018 | Minov | ................ | H04L 63/0815 |
| 2011/0307622 A1* | 12/2011 | Williams | ................ | H04L 63/08 709/229 |
| 2013/0318348 A1* | 11/2013 | Lebron | ............... | H04L 63/0428 713/168 |
| 2014/0189799 A1* | 7/2014 | Lu | .......................... | H04L 63/08 726/4 |
| 2014/0223175 A1* | 8/2014 | Bhatnagar | ................ | G09C 5/00 713/159 |
| 2015/0039444 A1* | 2/2015 | Hardin | ............... | G06Q 30/0273 705/14.69 |
| 2015/0101025 A1* | 4/2015 | Murata | ................... | G06F 21/10 726/4 |
| 2015/0244712 A1* | 8/2015 | Iwanski | ............. | H04L 63/0428 713/153 |

(Continued)

OTHER PUBLICATIONS

"European Application Serial No. 17001959.0, Extended European Search Report dated May 8, 2018", 8 pgs.

(Continued)

*Primary Examiner* — Joseph P Hirl
*Assistant Examiner* — Stephen T Gundry
(74) *Attorney, Agent, or Firm* — Schwegman Lundberg & Woessner, P.A.

(57) ABSTRACT

A system receives a request from an in-browser application for an authorization code, creates a session that re-directs the in-browser application to an authorization server, and receives the authorization code from the authorization server by way of the in-browser application. The system requests an access token from the authorization server and receives the access token from the authorization server. The system then receives a request from the in-browser application for a resource, uses the access token to request the resource from a third-party resource server, and returns the resource to the in-browser application.

21 Claims, 6 Drawing Sheets

(56) References Cited

U.S. PATENT DOCUMENTS

| | | | |
|---|---|---|---|
| 2016/0088019 A1* | 3/2016 | Li | G06F 21/53 726/1 |
| 2016/0307194 A1* | 10/2016 | Bhatnagar | H04L 63/0838 |
| 2016/0308678 A1* | 10/2016 | Bhatnagar | G09C 5/00 |
| 2016/0328707 A1* | 11/2016 | Wagner | G06Q 20/38215 |
| 2016/0351080 A1* | 12/2016 | Bhatnagar | G09C 5/00 |
| 2017/0019402 A1* | 1/2017 | Kulkarni | H04L 63/0807 |
| 2017/0026376 A1* | 1/2017 | Matsugashita | H04L 63/0876 |
| 2017/0213220 A1* | 7/2017 | Tomlinson, Jr. | G06Q 20/4014 |
| 2017/0279798 A1* | 9/2017 | Reynolds | G06F 21/35 |
| 2017/0324719 A1* | 11/2017 | Mason | H04L 63/08 |
| 2017/0324749 A1* | 11/2017 | Bhargava | H04L 63/108 |
| 2017/0329957 A1* | 11/2017 | Vepa | G06F 21/445 |
| 2017/0331791 A1* | 11/2017 | Wardell | H04W 12/06 |
| 2017/0331812 A1* | 11/2017 | Lander | H04L 63/0815 |
| 2017/0331813 A1* | 11/2017 | Lander | H04L 63/0815 |
| 2017/0331829 A1* | 11/2017 | Lander | G06F 21/6218 |
| 2017/0331832 A1* | 11/2017 | Lander | H04L 63/102 |
| 2017/0346804 A1* | 11/2017 | Beecham | H04L 63/08 |
| 2017/0346830 A1* | 11/2017 | Goldfarb | H04L 67/20 |
| 2017/0366547 A1* | 12/2017 | Goldfarb | H04L 63/08 |
| 2018/0041491 A1* | 2/2018 | Gupta | H04L 63/08 |
| 2018/0075231 A1* | 3/2018 | Subramanian | G06F 21/41 |
| 2018/0077138 A1* | 3/2018 | Bansal | H04L 63/108 |
| 2018/0077143 A1* | 3/2018 | Sridharan | G06Q 10/10 |
| 2018/0081983 A1* | 3/2018 | Carru | H04L 67/20 |
| 2018/0083967 A1* | 3/2018 | Subramanian | G06F 8/65 |
| 2018/0091490 A1* | 3/2018 | Wang | H04L 63/08 |
| 2018/0337914 A1* | 11/2018 | Mohamad Abdul | H04L 63/0807 |

OTHER PUBLICATIONS

Denniss, W, et al., "OAuth 2.0 for Native Apps", OAuth Working Group, (Mar. 2016), 1-16.

Hardt, D, et al., "The OAuth 2.0 Authorization Framework;", Internet Engineering Task Force. Request for Comments 6749, (Oct. 2012), 1-76.

* cited by examiner

US 10,230,720 B2

AUTHORIZATION CODE FLOW FOR IN-BROWSER APPLICATIONS

TECHNICAL FIELD

The present disclosure relates to the use of authorization codes and access codes to access information resources, and in an embodiment, but not by way of limitation, to a system and service that uses authorization code flow to retrieve and provide authorization codes and access codes for in-browser applications.

BACKGROUND

In the early days of web-based applications, there were many scenarios in which a user was asked to provide his or her most secret credentials, such as a user name and password, to gain access to a web page or web site. The web site could then browse through the user's mailboxes, and access on behalf of the user the user's protected resources such as an email box. This was recognized as not being acceptable from a security standpoint, because the user was passing over his or her most secret credentials to an application that may not be fully trustworthy. The application of questionable trustworthiness would then be allowed to act on the user's behalf under the full scope of the user's credentials. In such a scenario, the web site would even be able to send an email, without the user's knowledge, on the user's behalf.

BRIEF DESCRIPTION OF THE DRAWINGS

Some example embodiments of the present disclosure are illustrated by way of example and not limitation in the figures of the accompanying drawings, in which like reference numbers indicate similar elements, and in which.

DETAILED DESCRIPTION

Figure 1:
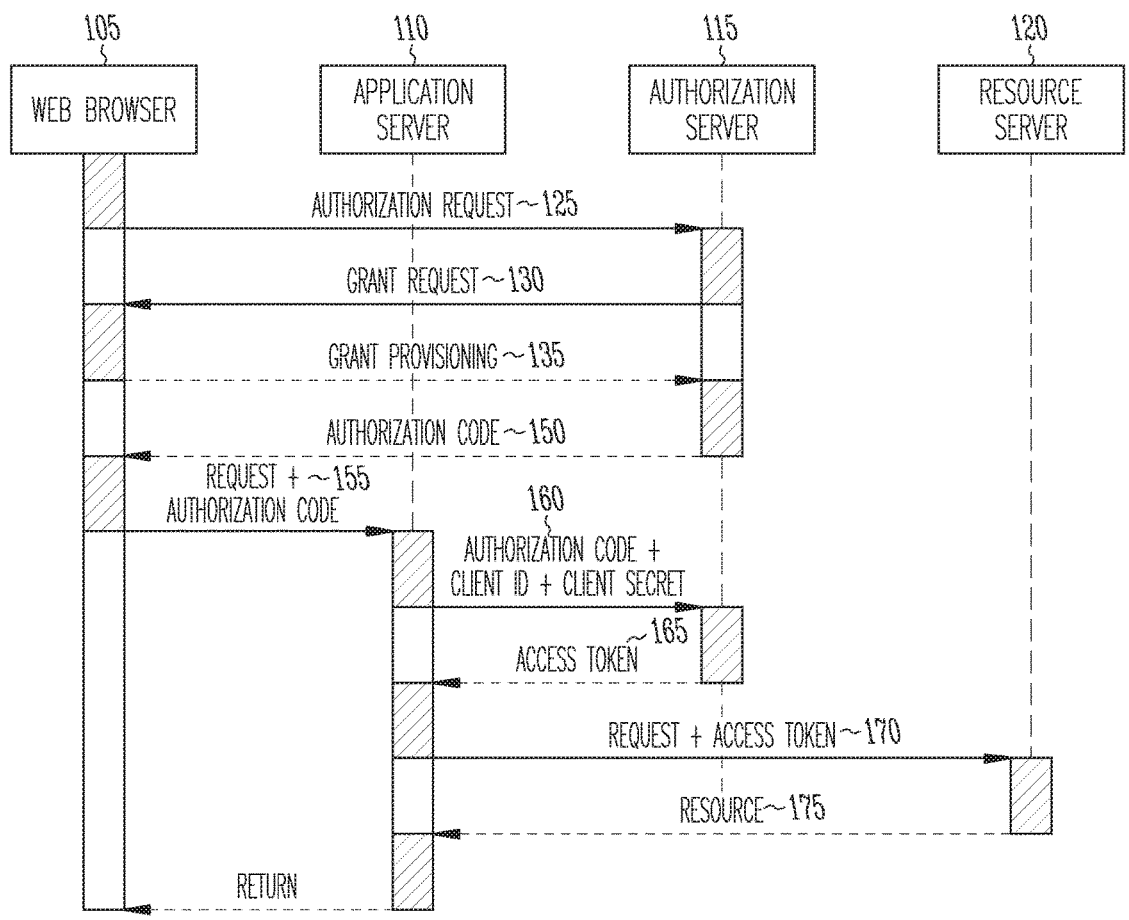
FIG. 1 is a block diagram of OAuth2.0 authorization code flow and an application server upon which one or more embodiments of the present disclosure can execute.
Figure 2:
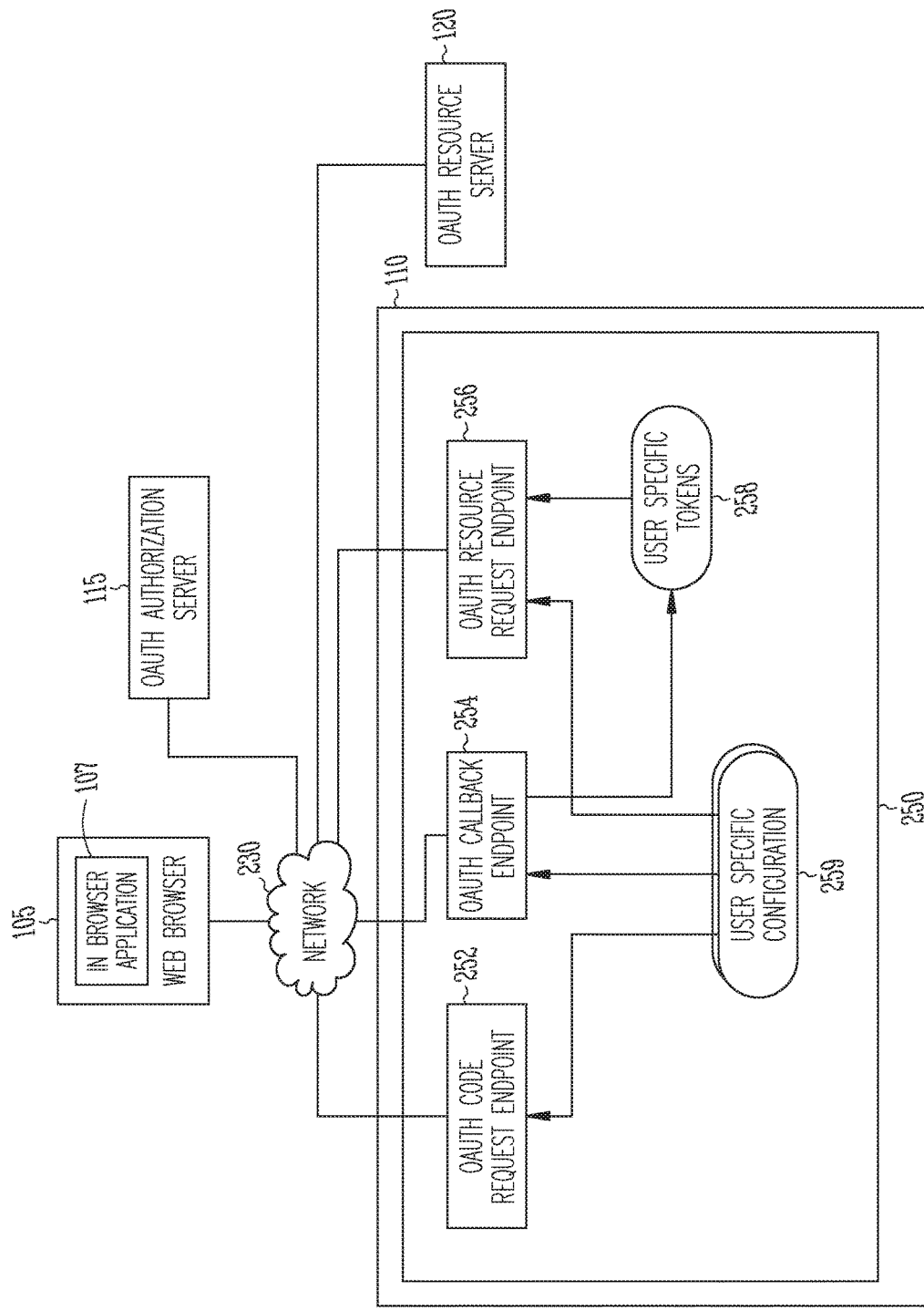
FIG. 2 is a block diagram of an embodiment of the present disclosure that executes in the application server of FIG. 1.

Example methods and systems of the present disclosure use authorization codes and access codes to access information resources for in-browser applications. In the following description, for purposes of explanation, numerous specific details are set forth in order to provide a thorough understanding of example embodiments. It will be evident, however, to one skilled in the art, that the present embodiments can be practiced without these specific details.

Security issues associated with the early days of web-based applications as discussed above were the fundamental motivation for introducing the OAuth standard, which is an open standard for authorization. It is commonly used as a way for an Internet user to login to third party websites using the user's account at other Internet-based applications (such as Google, Facebook, and Twitter). An advantage of OAuth is that the user does not expose his or her password.

Generally, OAuth provides to clients a secure delegated access to server resources on behalf of a resource owner. It specifies a process for resource owners to authorize third-party access to their server resources without the third-party sharing his or her credentials. OAuth essentially allows access tokens to be issued to third-party clients by an authorization server, with the approval of the resource owner. The third party then uses the access token to access the protected resources hosted by the resource server.

The access token of the OAuth authorization service is generated in what is referred to as the OAuth flows. To obtain an access token, a user has to request the access token from the authorization server with an authorization request. The authorization server first needs to know who the user is, authenticate the user (for example with the user's name and password), and upon successful authentication, the authorization server asks the user if the client that sent the authorization request is allowed to act on behalf of the user. In some situations, this is all done within a specific scope and that scope further narrows down what the client is allowed to do on behalf of the user.

The OAuth server asks the user if the client is allowed to access the resources within a specific scope, and if the user confirms that, the OAuth server sends back an authorization code to the OAuth client application. The client application then uses that authorization code, which represents a one-time token, to indicate the grant given to the client application by the user to access the protected resources of the user on behalf of the user by the client.

In general, with OAuth authorization, the client or the recipient of the access token, which is the OAuth client, needs to make sure that the access token is stored securely. However, with in-browser applications, there is no place to store that secret or confidential credential (the access token), so it is still a credential that gives the owner of that credential certain permissions to access the owner's protected resources. This is the reason that the access token, just like a password, should be stored securely. However, JavaScript-based applications that run inside a browser have no real secure place to store these access tokens. Consequently, the embodiments of this disclosure were developed to provide a place to securely store these access tokens. That is, these embodiments manage on a server side a secure storage protocol for these access tokens.

A purpose therefore of one or more embodiments of the present disclosure is to allow an in-browser application to leverage the OAuth 2.0 authorization code grant flow. There are different grant flows described by the OAuth 2.0 authorization framework. One of those grant flows, the authorization code flow, involves a part of an application that runs on an application server. This part can communicate with the authorization server outside the user agent (or web browser), and can provide client credentials and obtain an access token without exposing the access token to the resource owner's user agent. The authorization code grant flow has benefits that other flows (for example, the implicit grant flow) do not, such as the ability to authenticate the client, as well as the transmission of the access token directly to the client without passing it through the resource owner's user-agent and potentially exposing the access token to others, including the resource owner. Embodiments permit an in-browser application to leverage the authorization code flow and its security benefits, and are basically a service that is invoked by an in-browser application, wherein the service performs requests to and handles responses from an OAuth authorization server.

The authorization code grant flow cannot be used by the in-browser application because the in-browser application cannot communicate with the OAuth authorization server except via the user-agent. Therefore, such an in-browser application uses the implicit grant flow of the OAuth2.0 authorization network. However, the implicit grant flow, like the pre-OAuth framework as explained above, has security implications. The implicit grant flow was developed and designed to serve in-browser applications, that is, applications that are Java-Script applications and running only in the web browser. Consequently, this means that every user can look at it, and the browser application therefore cannot securely store any credentials. That is the reason that the in-browser application cannot have a client ID and the reason that the in-browser application cannot store the access token. It is this infrastructure that, as noted, causes the different security issues that embodiments of the present disclosure address.

In an embodiment, these Java-Script in-browser application security issues are addressed by the disclosed service that runs on an application server. The disclosed service has three end points or nodes. The in-browser application can communicate with these three end points. The end points include a consumer or user configuration that is user-specific. Therefore, every user of these end points can have his or her own account, that is, his or her own configuration. In this setup, one user of the service doesn't interfere with any other user of the service. An embodiment also persists the obtained access token so that it can be used to access different resources of the same resource server at a later time.

In order to request an authorization code from an OAuth authorization server, a request is submitted to the authorization server. The request contains information relating to the OAuth client ID, a redirect uniform resource locator (URL), a scope, and a state. The service resident in an application server provides an endpoint accessible by a web browser, for example:
https://oauthasservices-y2dee844e.example.com/oauth2/request.
The y2dee844e portion of the URL identifies the user of the service so that the implementation uses the configuration that is relevant for this particular user. The in-browser application redirects the user agent to the endpoint. The service reads the user-specific configuration, creates a session for the user, and redirects the user agent to the authorization server. The authorization server code endpoint URL, the scope, and the OAuth client ID that are needed for the request are taken from the user-specific configuration. The redirect URL parameter points to another endpoint provided by the service, "a callback endpoint," which can be represented or invoked, for example, by:
https://oauthasservices-y2dee844e.example.com/oauth2/callback.
A state parameter is generated by the service and its value is stored in the user session. The origin of the caller is also recorded in the user session.

Once the authorization server sends back an authorization code, the authorization code is sent via the user-agent to the callback endpoint. The callback endpoint extracts the authorization code and the state from the request. The state's value is compared with the state value that is stored in the user session. The request is processed further only if the two state values match. The service requests an access token by executing a request outside the user agent to the token endpoint of the authorization server. The URL of the token endpoint of the authorization server is retrieved from the user-specific configuration. The service also uses a client ID and a client password from that configuration. As a result of this call, the service acquires an access token. It is noted that in an embodiment, the service provides different endpoints for different users, thereby permitting the service to recognize users and use configurations that are relevant for the particular user.

In order to perform requests to a resource server with the correct access token, the in-browser application invokes another endpoint provided by the service, for example:
https://oauthasservices-y2dee84e.example.com/oauth2/proxy.
The service recognizes the user by a cookie that holds the user's unique ID, and the service finds an associated access token, if one is available. The service uses an available access token to issue a request outside the user agent to the resource server. The host of the server is known via the user-specific configuration. The service returns the response received by the resource server to the caller, thus the information reaches the in-browser application.

In an embodiment, since an acquired access token could be used more than once, as noted above, it can be persisted. When it is persisted, the access token is associated with a unique ID that is associated with the user. When a session is established with the user's agent, a browser cookie is issued with a unique ID. In later requests, the user's agent sends this cookie back and the user is thereby recognized, and only tokens associated with the user are used.

The request to the authorization server is executed in the following manner. The in-browser application communicates with the service's request end point, which, based on the configuration, sends the request to the authorization server. This request goes through the browser, but the request doesn't contain any confidential information. Now, at this point in time, the authorization server receives the request and issues an authorization code. The authorization code is sent back to the service, that is, to the system that made the request. The authorization code from the authorization server is received by a second endpoint, the callback endpoint. The service then exchanges the authorization code for an access token, which is then securely stored. At this point in time, the service has an access token that is not shared with the in-browser application in any way. It would not be desirable to share the access token with the in-browser application because of the security issues discussed above. However, the service still wants to provide a way that the in-browser application can request resources with this access token.

So, for the service to provide a way for the in-browser application to request a resource with the access token, the service provides the third end point, referred to above as the resource request endpoint. The purpose of the resource request endpoint is that the in-browser application can request resource-protected material with OAuth, but the in-browser application actually requests the resource-protected material via the resource request endpoint. When the resource request endpoint receives the request, it enhances the request with the access token, and it then requests the actual resource, receives the resource, and sends the resource to the in-browser application. In this manner, the service avoids all of the problems of the implicit grant flow, and the in-browser application doesn't have to change anything in the way of its programming model.

As noted, in an embodiment, the request end point can use the access token multiple times to handle multiple requests for different protected resources. In order to be able to do this, the access token is user-specific so that the user can be identified. That is, the service has to associate the access token (which is stored in the service in the application server) with the user. The service does this by issuing a specific cookie that the browser itself handles. The browser stores the cookie and transmits the cookie with every request to the resource request end point. The cookie can therefore relate a stored access token with the user and then reuse the access token for many requests. Consequently, the user at the web browser can seek out a different resource and not have to go through the authorization server, the access code request end point, or the callback endpoint again.

An embodiment is then basically extending the OAuth2.0 standard with a server side service that enables the OAuth2.0 flow to be used securely by in-browser applications. The existing standards are extended with the present disclosure's new architectural approach.

Figure 3A:
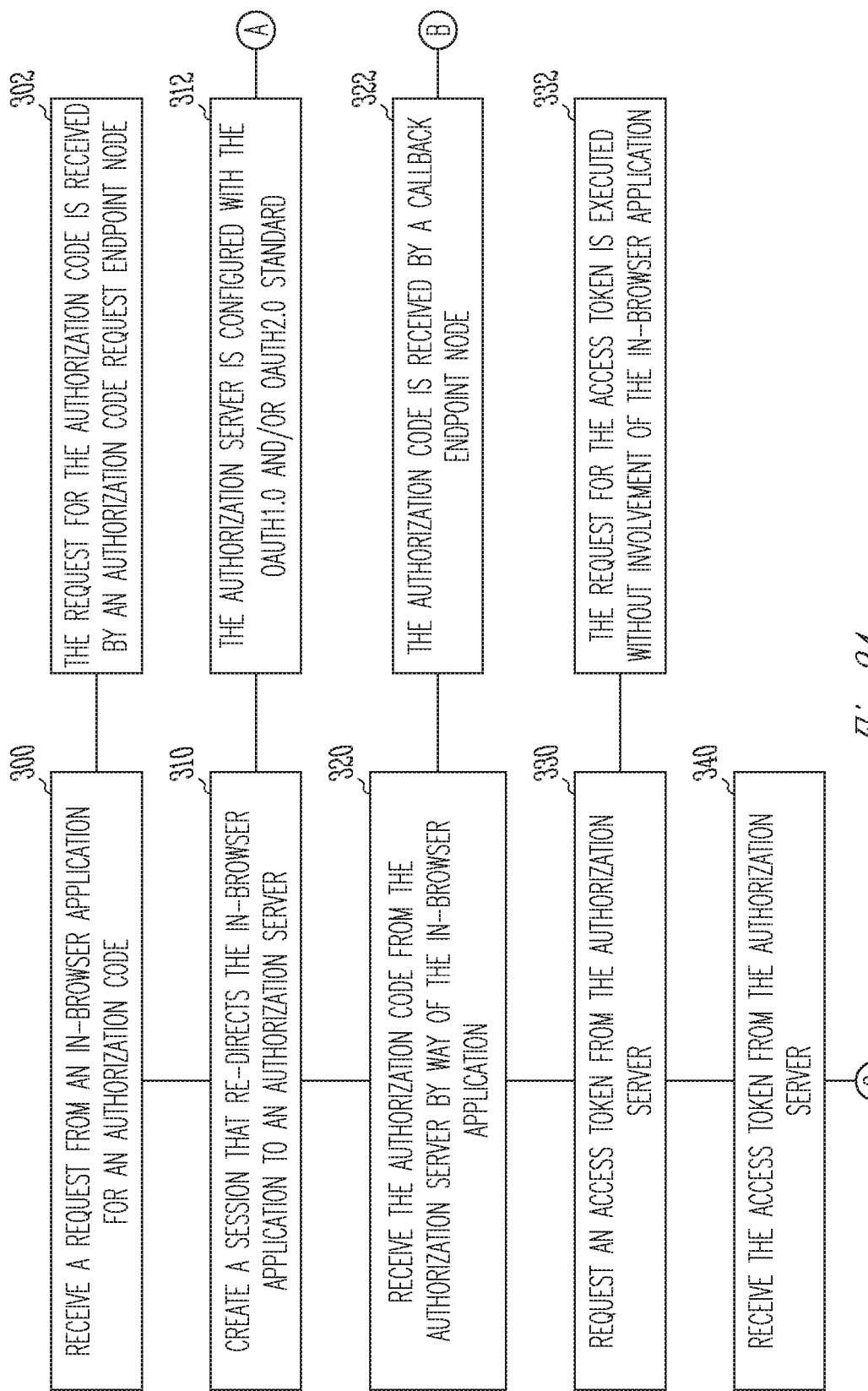
FIGS. 3A, 3B, and 3C are block diagrams illustrating operations and features of an authorization code flow for an in-browser application.
Figure 3B:
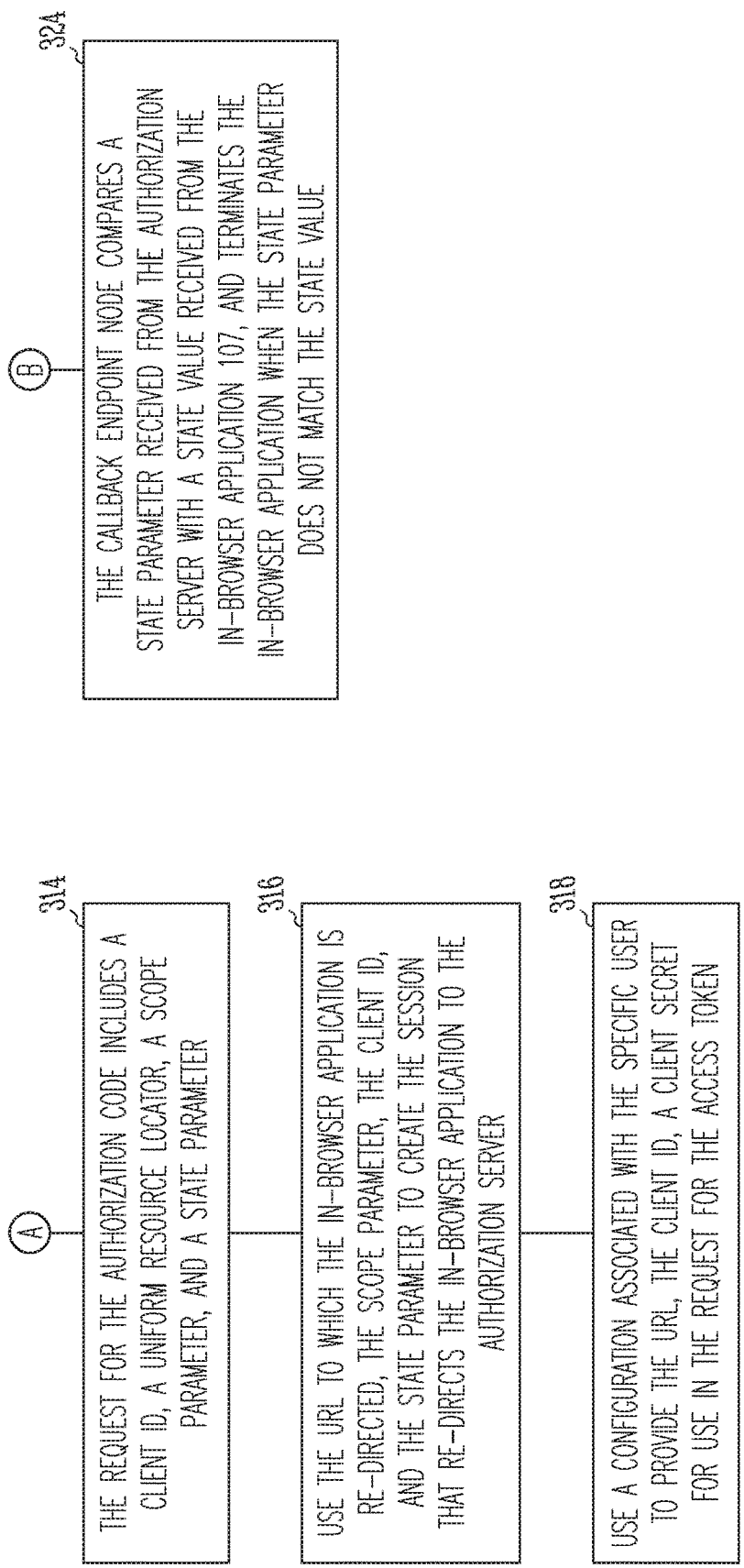
Figure 3C:
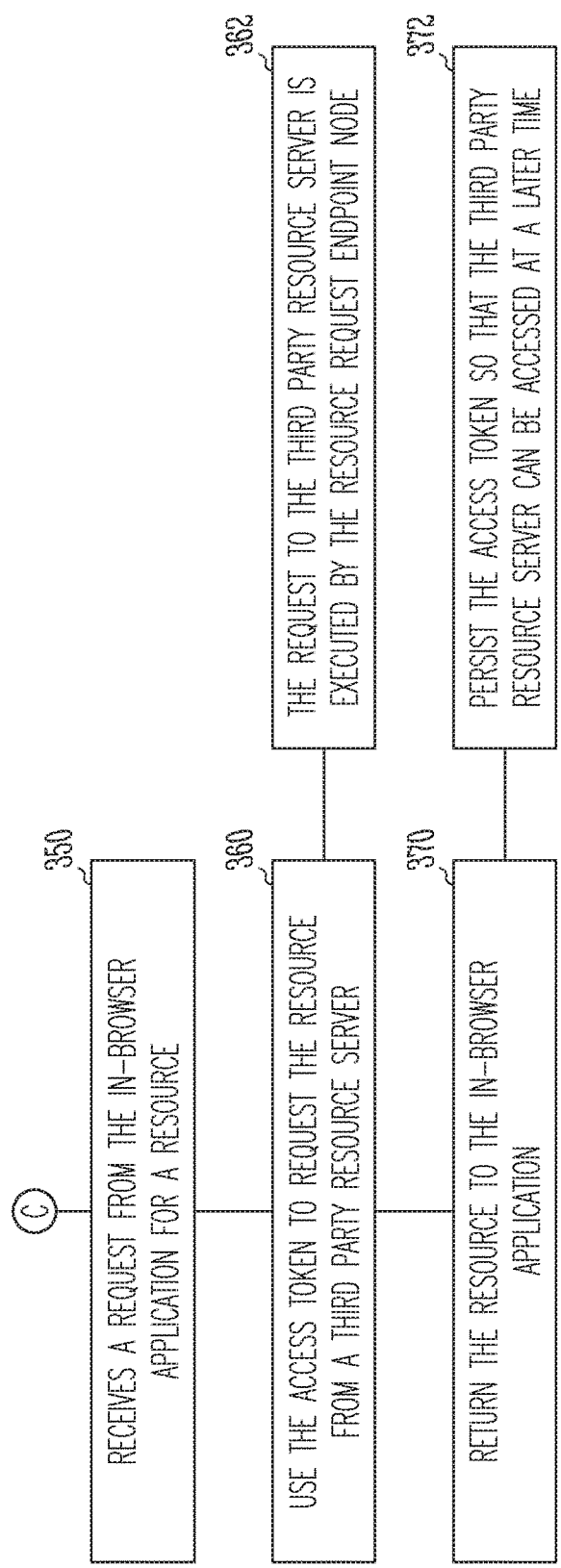

FIGS. 3A, 3B, and 3C are a block diagram illustrating operations and features of an authorization code flow for an in-browser application. FIGS. 3A, 3B, and 3C include a number of process blocks 300-372. Though arranged serially in the example of FIGS. 3A, 3B, and 3C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 1, 2, 3A, 3B, and 3C, at 300, a server-based authorization service for an in-browser application (105, 107) receives a request 125 via network 230 from the in-browser application 107 for an authorization code. As will be explained below, this request for an authorization code is for a specific user. As indicated at 302, the request for the authorization code from the in-browser application is received by an authorization code request endpoint node 252 in the application server 110.

At 310, the authorization service creates a session that re-directs the in-browser application 107 to an authorization server 115. As indicated at 312, the authorization server 115 is configured with the OAuth1.0 and/or OAuth2.0 standard for authorization. The request from the in-browser application 107 for the authorization code includes a client ID, a uniform resource locator (URL), a scope parameter, and a state parameter (314). The client ID is used to identify the specific user. The URL is the address to which the in-browser application 107 is re-directed. The scope parameter and the state parameter are used to verify that the in-browser application 107 and the authorization service 250 are in sync, which is discussed in detail below. Additionally, as indicated at 316, the authorization service 250 uses the URL to which the in-browser application 107 is re-directed, the scope parameter, the client ID, and the state parameter to create the session that re-directs the in-browser application 107 to the authorization server 115. At 318, the authorization service 250 uses a configuration associated with the specific user to provide the URL to which the in-browser application is re-directed, the client id that identifies the specific user, and a client password or secret associated with the specific user for use in the request for the access token from the authorization server 115. This configuration is stored in the user specific configuration 259. These operations involve a grant request 130 by the authorization server 115 and a grant provisioning 135 by the web browser 105.

At 320, the authorization service 250 receives the authorization code 150 from the authorization server 115 by way of the in-browser application 107. As indicated at 322, the authorization code 150 is received by a callback endpoint node 254. The callback endpoint node 254 is operable to compare a state parameter received from the authorization server 115 with a state value received from the in-browser application 107, and to terminate the in-browser application 107 when the state parameter does not match the state value (324).

At 330, the authorization service 250 requests (155, 160) an access token 165 from the authorization server 115. As noted above, this request is made by supplying the following information to the authorization server 115: a client ID, a uniform resource locator (URL), a scope parameter, and a state parameter. As indicated at 332, the request for the access token 165 from the authorization server 115 is executed without involvement of the in-browser application 107. At 340, the authorization service 250 receives the access token 165 from the authorization server 115. At 350, the authorization service 250 receives a request from the in-browser application 107 for a resource, and at 360 the authorization service 250 uses the access token 165 to request the resource (170) from a third party resource server 120. As indicated at 362, the request to the third-party resource server 120 is executed by the resource request endpoint node 256. At 370, the authorization service 250 returns the resource (175) to the in-browser application 107. The resource request endpoint node 256 can persist the access token 165 at 258 by recognizing the specific user by a cookie on the web browser 105. Such a cookie includes a user ID. The resource request endpoint node 256 then finds an access token associated with the user ID, and uses the associated access token 165 to access the third-party resource server 120 at a later time for a different resource. The resource request endpoint node 256 then receives the different resource from the third-party resource server 120, and returns the different resource to the in-browser application (107) at 372.

Modules, Components and Logic

Certain embodiments are described herein as including logic or a number of components, modules, or mechanisms. Modules can constitute either software modules code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 230 of FIG. 2) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 4:
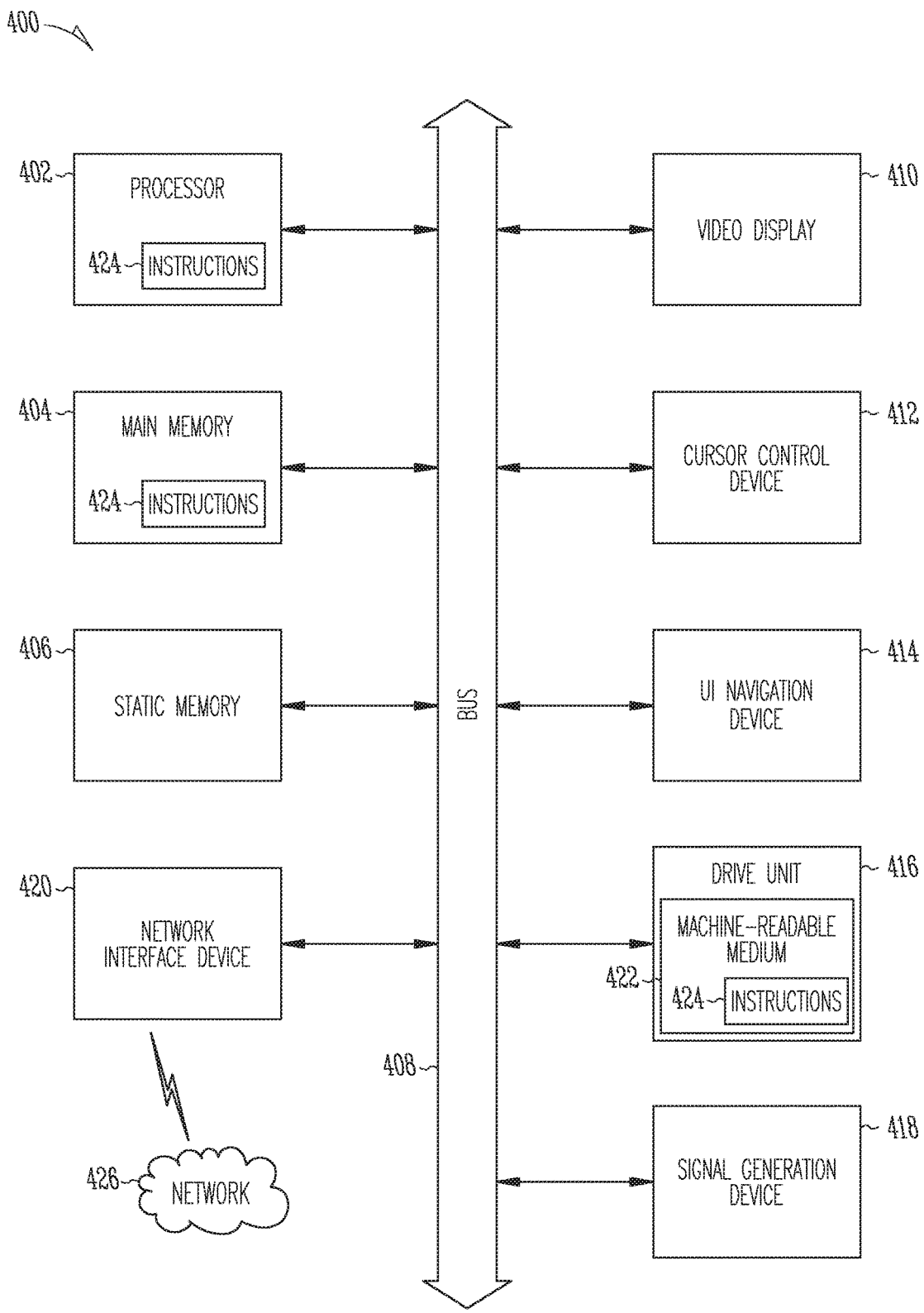
FIG. 4 is a block diagram illustrating components of a machine that are able to read instructions from a machine-readable medium (e.g., a machine-readable storage medium) and perform any one or more of the methodologies discussed herein.

FIG. 4 is a block diagram of a machine in the example form of a computer system 400 within which instructions 424 for causing the machine to perform any one or more of the methodologies discussed herein can be executed, in accordance with some example embodiments. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 can further include a video display unit 410 (e.g., a liquid crystal display (LCD) or a cathode ray tube (CRT)). The computer system 400 also includes an alphanumeric input device 412 (e.g., a keyboard), a user interface (UI) navigation (or cursor control) device 414 (e.g., a mouse), a disk drive unit 416, a signal generation device 418 (e.g., a speaker) and a network interface device 420.

The disk drive unit 416 includes a machine-readable medium 422 on which is stored one or more sets of data structures and instructions 424 (e.g., software) embodying or utilized by any one or more of the methodologies or functions described herein. The instructions 424 can also reside, completely or at least partially, within the main memory 404 and/or within the processor 402 during execution thereof by the computer system 400, the main memory 404 and the processor 402 also constituting machine-readable media. The instructions 424 can also reside, completely or at least partially, within the static memory 406.

While the machine-readable medium 422 is shown in an example embodiment to be a single medium, the term "machine-readable medium" can include a single medium or multiple media (e.g., a centralized or distributed database, and/or associated caches and servers) that store the one or more instructions 424 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 424 can further be transmitted or received over a communications network 426 using a transmission medium. The instructions 424 can be transmitted using the network interface device 420 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method comprising:
in an application server:
receiving a request from an in-browser application for an authorization code for a specific user, wherein the in-browser application comprises a Java-Script-based application that runs only inside of a browser;
creating a session that re-directs the in-browser application to an authorization server;
receiving the authorization code from the authorization server by way of the in-browser application;
requesting an access token from the authorization server;
receiving the access token from the authorization server;
managing a secure storage protocol for the access token on the application server;
receiving a request from the in-browser application for a resource;
using the access token to request the resource from a third-party resource server; and
returning the resource to the in-browser application;
wherein the in-browser application communicates with a plurality of end point nodes on the application server.

2. The method of claim 1, wherein the authorization server comprises one or more of an OAuth1.0 and an OAuth2.0 standard for authorization.

3. The method of claim 2, wherein the request from the in-browser application for the authorization code comprises a client ID to identify the specific user, a uniform resource locator (URL) to which the in-browser application is re-directed, a scope parameter, and a state parameter.

4. The method of claim 3, comprising using the URL to which the in-browser application is re-directed, the scope parameter, the client ID, and the state parameter to create the session that re-directs the in-browser application to the authorization server.

5. The method of claim 3, comprising using a configuration associated with the specific user to provide the URL to which the in-browser application is re-directed, the client ID that identifies the specific user, and a client secret associated with the specific user for use in the request for the access token from the authorization server.

6. The method of claim 1, wherein the request for the authorization code from the in-browser application is received by an authorization code request endpoint node.

7. The method of claim 1, wherein the authorization code is received by a callback endpoint node.

8. The method of claim 7, wherein the callback endpoint node is operable to compare a state parameter received from the authorization server with a state value received from the in-browser application, and to terminate the in-browser application when the state parameter does not match the state value.

9. The method of claim 1, wherein the request to the third-party resource server is executed by a resource request endpoint node.

10. The method of claim 9, wherein the resource request endpoint node is operable to persist the access token by recognizing the specific user by a cookie on a web browser that comprises a user ID; to find an access token associated with the user ID; to use the associated access token to access the third-party resource server at a later time for a different resource; to receive the different resource from the third party resource server; and to return the different resource to the in-browser application.

11. The method of claim 1, wherein the request for the access token from the authorization server is executed without involvement of the in-browser application.

12. The method of claim 1,
wherein the requesting the access token from the authorization server comprises receiving a request from the in-browser application at a first request endpoint in the application server;
wherein the receiving the authorization code from the authorization server by way of the in-browser application comprises receiving the authorization code from the authorization server at a second callback endpoint in the application server;
exchanging the authorization code for the access token and securely storing the access token in the application server such that the access token is not shared with the in-browser application;
wherein the receiving the request from the in-browser application for a resource is received at a third resource request endpoint in the application server;
enhancing the request for a resource with the access token;
requesting the resource using the enhanced request;
receiving the resource; and
transmitting the resource to the in-browser application.

13. A non-transitory computer-readable medium comprising instructions that, when executed by a processor execute a process comprising:
in an application server:
receiving a request from an in-browser application for an authorization code for a specific user, wherein the in-browser application comprises a Java-Script-based application that runs only inside of a browser;
creating a session that re-directs the in-browser application to an authorization server;
receiving the authorization code from the authorization server by way of the in-browser application;
requesting an access token from the authorization server;
receiving the access token from the authorization server;
managing a secure storage protocol for the access token on the application server;
receiving a request from the in-browser application for a resource;
using the access token to request the resource from a third-party resource server; and
returning the resource to the in-browser application;
wherein the in-browser application communicates with a plurality of end point nodes on the application server.

14. The non-transitory computer-readable medium of claim 13, wherein the authorization server comprises one or more of an OAuth1.0 and an OAuth2.0 standard for authorization.

15. The non-transitory computer-readable medium of claim 14, wherein the request from the in-browser application for the authorization code comprises a client ID to identify the specific user, a uniform resource locator (URL) to which the in-browser application is re-directed, a scope parameter, and a state parameter.

16. The non-transitory computer-readable medium of claim 15, comprising instructions for:
using the URL to which the in-browser application is re-directed, the scope parameter, the client ID, and the state parameter to create the session that re-directs the in-browser application to the authorization server; and
using a configuration associated with the specific user to provide the URL to which the in-browser application is re-directed; the client ID that identifies the specific user; and a client secret associated with the specific user for use in the request for the access token from the authorization server.

17. The non-transitory computer-readable medium of claim 13, wherein the request for the authorization code from the in-browser application is received by an authorization code request endpoint node.

18. The non-transitory computer-readable medium of claim 13,
wherein the authorization code is received by a callback endpoint node; and
wherein the callback endpoint node is operable to compare a state parameter received from the authorization server with a state value received from the in-browser application, and to terminate the in-browser application when the state parameter does not match the state value.

19. The non-transitory computer-readable medium of claim 13,
wherein the request to the third-party resource server is executed by a resource request endpoint node; and
wherein the resource request endpoint node is operable to persist the access token by recognizing the specific user by a cookie on a web browser that comprises a user ID; to find an access token associated with the user ID; to use the associated access token to access the third-party resource server at a later time for a different resource; to receive the different resource from the third-party resource server; and to return the different resource to the in-browser application.

20. The non-transitory computer-readable medium of claim 13, wherein the request for the access token from the authorization server is executed without involvement of the in-browser application.

21. A system comprising:
a computer processor and a computer storage device, wherein the computer processor and the computer storage device are configured to:
in an application server:

receive a request from an in-browser application for an authorization code for a specific user, wherein the in-browser application comprises a Java-Script-based application that runs only inside of a browser;

create a session that re-directs the in-browser application to an authorization server;

receive the authorization code from the authorization server by way of the in-browser application;

request an access token from the authorization server;

receive the access token from the authorization server;

managing a secure storage protocol for the access token on the application server;

receive a request from the in-browser application for a resource;

use the access token to request the resource from a third-party resource server; and return the resource to the in-browser application;

wherein the in-browser application communicates with a plurality of end point nodes on the application server.

* * * * *